Sept. 6, 1960 F. G. FISCO 2,951,299
CHALKBOARD SURFACE

Filed April 30, 1959 2 Sheets-Sheet 1

INVENTOR.
FRED G. FISCO
BY Pyle & Fisher
ATTORNEYS

Sept. 6, 1960  F. G. FISCO  2,951,299
CHALKBOARD SURFACE

Filed April 30, 1959  2 Sheets-Sheet 2

INVENTOR.
FRED G. FISCO
BY Pyle & Fisher
ATTORNEYS

United States Patent Office 2,951,299
Patented Sept. 6, 1960

2,951,299

CHALKBOARD SURFACE

Fred G. Fisco, Brecksville, Ohio, assignor to Form-A-Top Products Co.

Filed Apr. 30, 1959, Ser. No. 810,081

1 Claim. (Cl. 35—63)

This invention relates in general to surface preparation for utilitarian and aesthetic purposes, and relates specifically to the resurfacing of a used chalk board area by the provision of an insert over the former surface.

The primary object of this invention is to provide a process for resurfacing school chalk boards with a new chalk board sheet.

A further object of this invention is to provide a process of fully concealing a space between a new chalk board surface and a molding around the old board.

And a further object of this invention is to provide an improved combination of an old surface as a base structure; a new surface; and a trim strip locked into a non-shifting position by a mechanical blockage.

Other objects and a fuller understanding of the invention may be had by referring to the following description and claim taken in conjunction with the accompanying drawings, in which:

Figure 1:
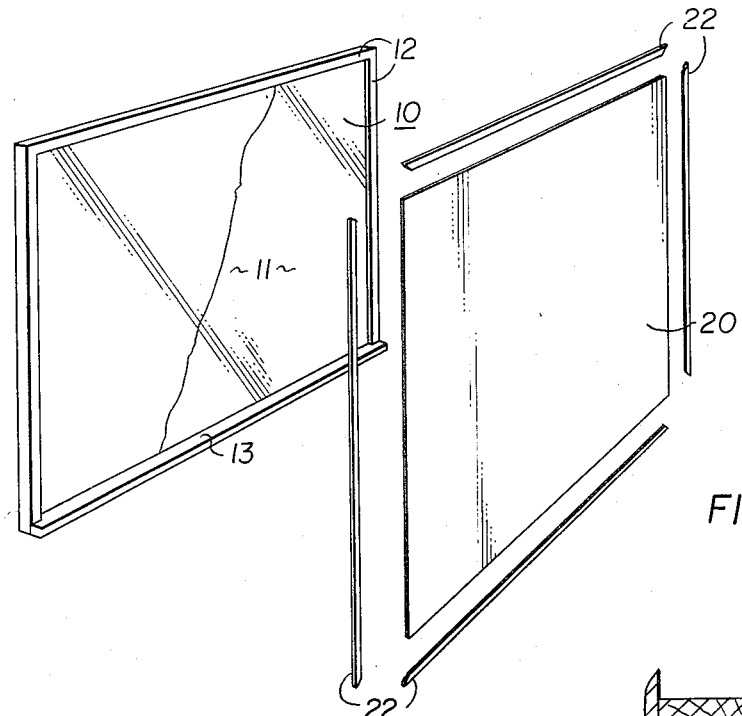
Figure 1 is an exploded view of an old chalk board structure in spaced relationship with a new covering sheet and molding to be placed over the old structure.

Enameled steel and other sheet, firm writing surfaces are finding wide acceptance as chalk board surfaces. Modern chalk boards in new school buildings and churches are generally of such material.

However, the removal of old chalk boards and the re-installation of a new chalk board in its place is an exceedingly expensive process and requires the classroom and its chalk boards to be out of use for a period of time. According to this invention it is possible for the maintenance people of even the smallest school or church building to resurface their chalk board equipment in the late afternoon period after classes are dismissed and be finished before class hours. In the drawing in Figure 1, there is illustrated an installed old chalk board 10 having a slate writing surface 11, and a conventional molding 12 as generally used for trim appearance around such chalk board. The usual chalk board is provided with a chalk and eraser tray 13 as the bottom part of the molding.

Figure 1 of the drawing illustrates, in part, the usual condition of an old chalk board. It is generally true that such slate chalk boards are broken and have long diagonal cracks which interfere with the usefulness of the board. Generally, this is the reason why the board is to be replaced or renewed according to the present invention.

An enameled steel sheet 20 is illustrated as a new writing surface in the area outlined by the trim molding 12. This enameled steel sheet material 20 is not a novel product of this invention and in fact is employed in the manufacture of new chalk boards. In new work, this material is mounted upon a support base, generally, and then is hung and trimmed in a new installation very much in the manner of the installation of other conventional chalk board structures. These chalk boards are factory made with the steel surface adhered under pressure to the base structure. No finer construction can be found for new installations; but the removal and replacement of old equipment, as pointed out before, is both costly and time-consuming.

Figure 2:
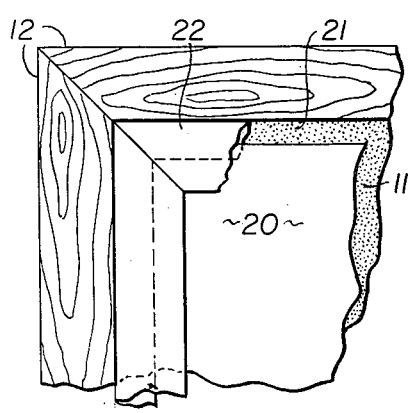
Figure 2 is a detail of a corner area of the composite structure renewed with a new surface.
Figure 3:
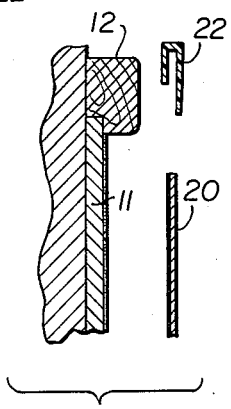
Figure 3 is a fragmentary exploded view showing the relationship of an old chalk board surface with a molding therearound and a new surface member and the molding strip, together with adhesive applied to the old and new surface for attachment.
Figure 4:
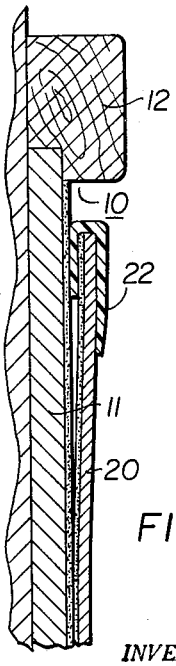
Figure 4 is a view similar in section to the Figure 3 illustrating the preliminary attachment of the new surface to the old with the molding strip tight to the edge of the new surface.

According to the illustrated embodiment of this invention, as best seen in Figures 2, 3, and 4, the steel sheet 20 may be quickly installed over the old chalk board surface and within the molding of the old chalk board in a very short period of time and without any dirt-collecting crevices to reduce the attractiveness of the refinished installation.

The enameled sheet 20 is supplied in a size larger than the opening outlined by the molding 12. The dimensions within the molding 12 are then transposed to the surface of the sheet 20 regardless of any irregularity or lack of geometric accuracy. Thus, if the molding 12—or the entire chalk board—has become warped with age, there will be no detriment in cutting the sheet 20 to fit within the molding 12.

However, it is virtually impossible to cut the sheet 20 to fit exactly within the molding 12 and to fit all of the irregularities of the molding 12. Hence, the size of the sheet 20 is cut with some clearance to allow the sheet 20 to fit easily within the outlined area and without undue concern about the nicks and irregularities in the molding 12. Thus, a small space around the edges of the sheet 20 will exist.

It is desirable to fill this space which is indicated by the reference character 21 in Figure 2 of the drawings, with a trim strip 22 to conceal such space. This invention provides a practical means of unusual nature to enable the installation of the enameled steel plate 20 and the trim 22 without the need for any special apparatus to install the sheet or to hold the sheet until a slow adhering adhesive may set.

Figure 5:
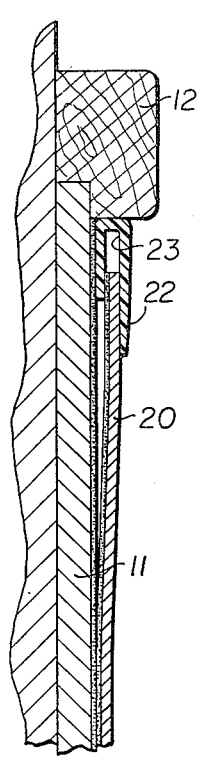
Figure 5 is a view similar to Figure 4 with the molding strip moved outwardly into contact with the permanent molding of the old chalk board structure; and, Figure 6 illustrates the means of adhering the adhesive surfaces in a manner to block the molding strip into its outward concealed condition.

The trim 22 as may be seen in the Figures 4 and 5 of the drawings, has a J cross-sectional configuration with an interior cavity 23 for the reception of the edge of the sheet 20. Such trim molding is common and well-known.

Next, the surface 11 of the old chalk board is coated over its entire area and up close to the molding 12 with a contact cement having the characteristic of adhering only when dried and only to another dried coating of the cement. This type of contact cement is widely used and well known. When a surface of this cement has dried reasonably well, it will not adhere to most materials such as plastic and paper.

A coating of contact cement is also placed over the back surface of the sheet 20 and extended completely to the edges of the sheet and allowed to dry. When the two surfaces are dried, the sheet 20 may be inserted into the area within the molding 12 and contact will take place to hold the sheet permanently positioned without other holding devices.

According to this invention, the trim molding 22 is inserted neatly around the sheet 20 and is telescoped over the edge of the sheet 20 as far as possible in order that the cavity 23 may conceal as much of the dried adhesive coating as possible. The trim stripping 22 is preferably of a flexible material such as plastic or rubber. This material will not adhere to the contact adhesive surface because such cement material has the characteristic of adhering only to another like cement surface. Thus, the trim surface 22 may be telescoped completely over the edge and then may be moved with respect to that edge if desired.

With the trim stripping telescoped to the smallest possible size on the edge of the sheet 20, the sheet 20 with the stripping thereon is then lifted into place and allowed to rest on the bottom edge of the molding, which in the drawing, is the chalk trough 13. With the sheet 20 slanting outwardly from the trough 13 in its initial position, it is then tilted upwardly and into contact with the coating of adhesive material on the board 11. A pressure approximately in the center of the area will cause an initial adherence sufficient to hold the sheet 20 in place without danger of falling.

Thereafter, a unique step of this invention permits the trim molding 22 to be shifted wherever needed to abut exactly against the molding 12 and conceal the entire crevice area between the sheet 20 and this molding 12.

Figure 6:
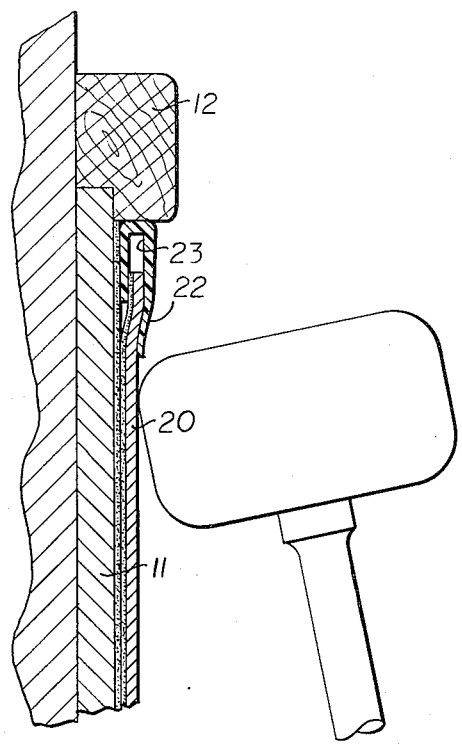

With the sheet 20 temporarily adhered in the center area, the workman installer proceeds to move the trim stripping 22 outwardly against the molding 12. Neither the dried contact surface on the old surface 11 or on the back of the sheet 20 will prevent such movement of the trim stripping 22. Furthermore, there is nothing to prevent the return movement of the stripping away from the molding 12 exept for the unique discovery of this invention. As illustrated in Figure 6, after having moved the trim into contact with the molding 12, a sharp pressure may be applied against the exterior surface of the sheet 20 at the edge of the trim stripping 22 which will deflect the sheet 20 inwardly and cause the two contact cement surfaces to come into contact at the very edge of the trim stripping. Thus, an adhered area just at the end of the trim stripping causes a physical block preventing the trim stripping 22 from moving away from the molding 12 thereafter.

The workman thus proceeds completely around the sides and top of the temporarily installed sheet 20, tapping as he proceeds, to lock the trim stripping in the outwardly position and causing further adherence of the new sheet 20 with the old surface.

After the trim stripping has been thus completely locked into a concealment position, the installer may proceed to apply pressure over the entire surface of the sheet 20 as much as needed to cause physical bonding and support of the new surface.

By this discovery of a means to conceal the unsightly space efficiently and positively without resorting to slow drying materials or materials which would adversely effect plastic and rubber trimmed stripping, the process of this invention produces a resultant combination structure of a reconstructed chalk board which enables the conversion of old to new with a minimum of time and expense and by completely unskilled labor.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

A reconstructed chalk board, comprising, a used wall mounted chalk board having a raised molding around the periphery thereof, said used chalk board serving as a mounted backing, a new sheet of chalk board material, the said sheet having a front chalk receiving surface, a back surface, and side edges, a flexible trim stripping having a J cross-sectional configuration having an interior cavity with an opening thereto, said side edges of the sheet material extending through said trim opening into said cavity, said side edges of said sheet material outlining a sheet material form substantially conforming to the outline established by said molding and of a size smaller, said trim stripping having a width and cavity depth permitting the trim stripping to abut the molding and to encompass the side edges of the sheet material, said sheet material adhered to said mounted backing by contact cement having the characteristic of adhering only to another dried surface of like cement, said cement extending on said mounted backing and said sheet material under the trim stripping, said trim stripping remaining unadhered but blocked into a space concealing trim position by contact adherence of the sheet to the backing material beyond the edge of the trim.

References Cited in the file of this patent

UNITED STATES PATENTS

| | | |
|---|---|---|
| 1,423,143 | Patterson | July 18, 1922 |
| 1,694,433 | Albert | Dec. 11, 1928 |
| 1,708,082 | Conrow | Apr. 9, 1929 |
| 1,827,389 | Friend | Oct. 13, 1931 |
| 2,298,743 | Lichtor | Oct. 13, 1942 |

FOREIGN PATENTS

| | | |
|---|---|---|
| 1,094,756 | France | Dec. 8, 1954 |